Dec. 13, 1955  E. FILTHUTH  2,726,696
POTATO MASHERS
Filed April 19, 1954
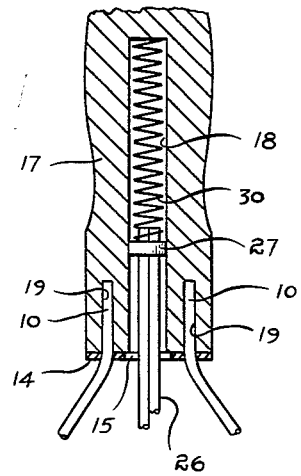
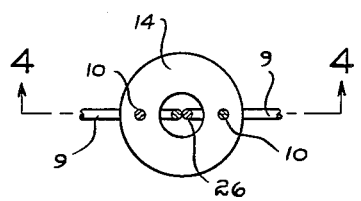
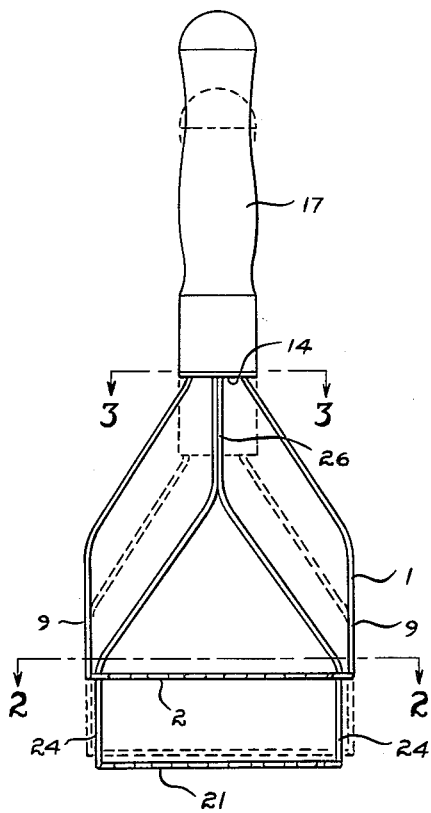
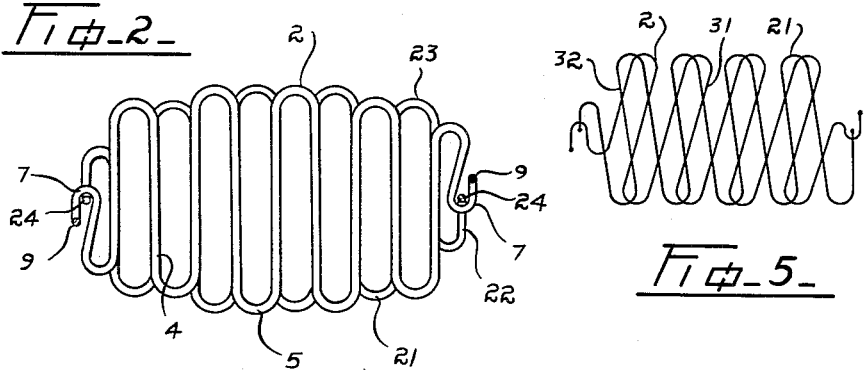
INVENTOR
ERNEST FILTHUTH
ATTORNEY

United States Patent Office 2,726,696
Patented Dec. 13, 1955

2,726,696

POTATO MASHERS

Ernest Filthuth, West Vancouver,
British Columbia, Canada

Application April 19, 1954, Serial No. 424,180

1 Claim. (Cl. 146—213)

My invention relates to improvements in potato mashers.

The objects of the invention are to provide a device having two coacting cutting elements which may be operated by a simple reciprocatory movement; to provide a masher which will require considerably less effort to use and accomplish a greater amount of mashing per stroke than any of the conventional implements now in general use.

These and other objects will appear as the specification proceeds.

Referring to the accompanying drawings:

Figure 1 is an elevational view of the invention.

Figure 2 is an enlarged sectional plan view taken on the line 2—2 of Figure 1.

Figure 3 is a similar view taken on the line 3—3 of Figure 1.

Figure 4 is a detail sectional view taken on the line 4—4 of Figure 3.

Figure 5 is a diagrammatic plan view of a modification of the invention.

In the drawings like characters of reference indicate corresponding parts in each figure.

The numeral 1 indicates generally a potato masher having a cutting element 2 formed of a length of wire which is bent to provide a plurality of spaced parallel bars 4 connected by semi-circular ends 5. Each side bar 4 terminates in an eye or guide 7 which is disposed in the plane of said bars and adjacent the guides the wire is bent upwardly at right angles to form shanks 9. The shanks converge intermediate their height and have closely spaced free ends 10 which are vertical and parallel to one another. The lower portions of the free ends 10 are connected together by a circular plate 14 having a centrally disposed opening 15, see Figures 3 and 4. A handle 17 having a central bore 18 and spaced openings 19 is secured to the plate 14 with the free ends 10 being received within said openings.

Beneath the cutting element 2 the device is provided with a second cutting element 21 which is also made up of a length of wire to provide bars 22, semi-circular ends 23 and perpendicular shanks 24. The shanks 24 slidably extend through the guides 7 of the upper element and converge to form a stem or plunger 26 which is fitted adjacent its tip with a collar 27. The plunger projects into the bore 18 of the handle and a spring 30 is interposed between the collar 27 and the base of said bore to normally urge the cutting elements apart to the position shown in Figure 1.

In the modification shown in Figure 5, the cutting elements are similarly mounted as in the preferred embodiment, viz.: the lower element is slidably mounted with respect to the upper element which is fitted with the handle. The bars 31 and 32 forming the upper and lower elements respectively cross one another transversely thus giving a greater slicing or mashing effect for each stroke of the implement.

In use, the masher is forced through the potato mass in the usual manner. As downward pressure is exerted upon the handle the spring 30 initially resists compression to the extent that the vertical spacing of the cutting elements is maintained, or substantially so, as the lower element cuts through the mass, causing it to be displaced laterally. Continued downward pressure upon the handle compresses the spring so that the upper element 2 is moved to further break up the mass already divided by the lower element and said mass is again disturbed first by the element 2, then by the element 21 as the implement is raised from the bottom of the pan.

What I claim as my invention is:

A potato masher comprising a cutting element having spaced cutter bars, said element being supported upon spaced shanks with the cutter bars extending diagonally back and forth between the spaced shanks, a handle secured to the free end of said shanks, said handle having a bore, a second cutting element beneath the first named cutting element and having spaced cutter bars at one end and a plunger adjacent the other end, said cutter bars extending diagonally between the shanks and divergently of the cutter bars of the first named element, said plunger being slidably mounted in the bore and a spring in said bore engaging the plunger and adapted to urge the cutting elements apart.

References Cited in the file of this patent
UNITED STATES PATENTS 1,023,317   Jackson _____ Apr. 16, 1912